US012656887B2

(12) United States Patent
Nishino et al.

(10) Patent No.: US 12,656,887 B2
(45) Date of Patent: Jun. 16, 2026

(54) ELECTROMAGNETIC PEN POSITION SENSOR WITH LOW-COUPLING LEAD WIRING

(71) Applicant: Wacom Co., Ltd., Saitama (JP)

(72) Inventors: Kei Nishino, Saitama (JP); Bunta Tauchi, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/827,390

(22) Filed: Sep. 6, 2024

(65) Prior Publication Data

US 2024/0427434 A1      Dec. 26, 2024

Related U.S. Application Data

(63) Continuation of application No. 18/361,535, filed on Jul. 28, 2023, now Pat. No. 12,111,985, which is a continuation of application No. PCT/JP2021/020573, filed on May 28, 2021.

(51) Int. Cl.
　　　*G06F 3/0354*　　　(2013.01)
　　　*G06F 3/041*　　　(2006.01)
(52) U.S. Cl.
　　　CPC ........ *G06F 3/03545* (2013.01); *G06F 3/0418* (2013.01)
(58) Field of Classification Search
　　　CPC ..... G06F 3/03545; G06F 3/0418; G06F 3/046
　　　USPC ........................................................ 345/179
　　　See application file for complete search history.

(56) References Cited

U.S. PATENT DOCUMENTS

2005/0134260 A1* 6/2005 Katsuhito ............... G06F 3/046
　　　　　　　　　　　　　　　　　　　　　324/247
2015/0220192 A1* 8/2015 Jeon ...................... G06F 3/0412
　　　　　　　　　　　　　　　　　　　　　345/174
2020/0001645 A1* 1/2020 Yano ...................... G06F 3/0488
2020/0393925 A1   12/2020 Chen et al.

FOREIGN PATENT DOCUMENTS

JP　　　　4405247 B2　　1/2010
WO　　2019171511 A1　　9/2019

OTHER PUBLICATIONS

International Search Report, dated Aug. 31, 2021, for International Patent Application No. PCT/JP2021/020573. (2 pages).

* cited by examiner

*Primary Examiner* — Mark Edwards
(74) *Attorney, Agent, or Firm* — Seed Intellectual Property Law Group LLP

(57) ABSTRACT

A sensor includes a plurality of coils including a plurality of first coils each extending in a first direction, and a plurality of second coils each extending in a second direction, a plurality of terminals provided for one ends and other ends of the plurality of coils, and a plurality of lead wires which connect the plurality of terminals to the corresponding one ends or other ends of the plurality of coils. The plurality of lead wires are arranged to extend along any of one or more directions which are at an angle relative to both the first direction and the second direction.

11 Claims, 17 Drawing Sheets

F I G . 4
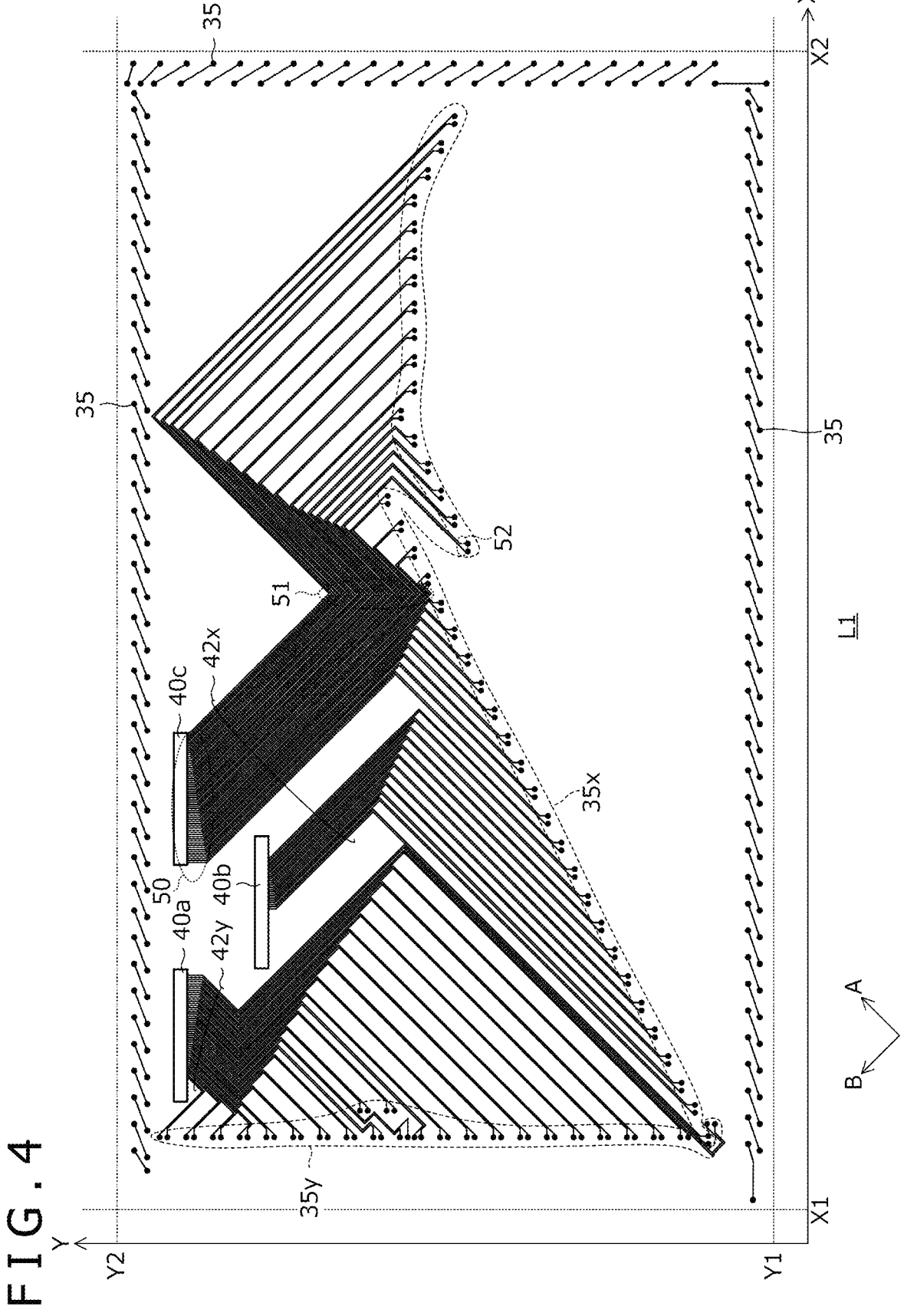

F I G . 1 0
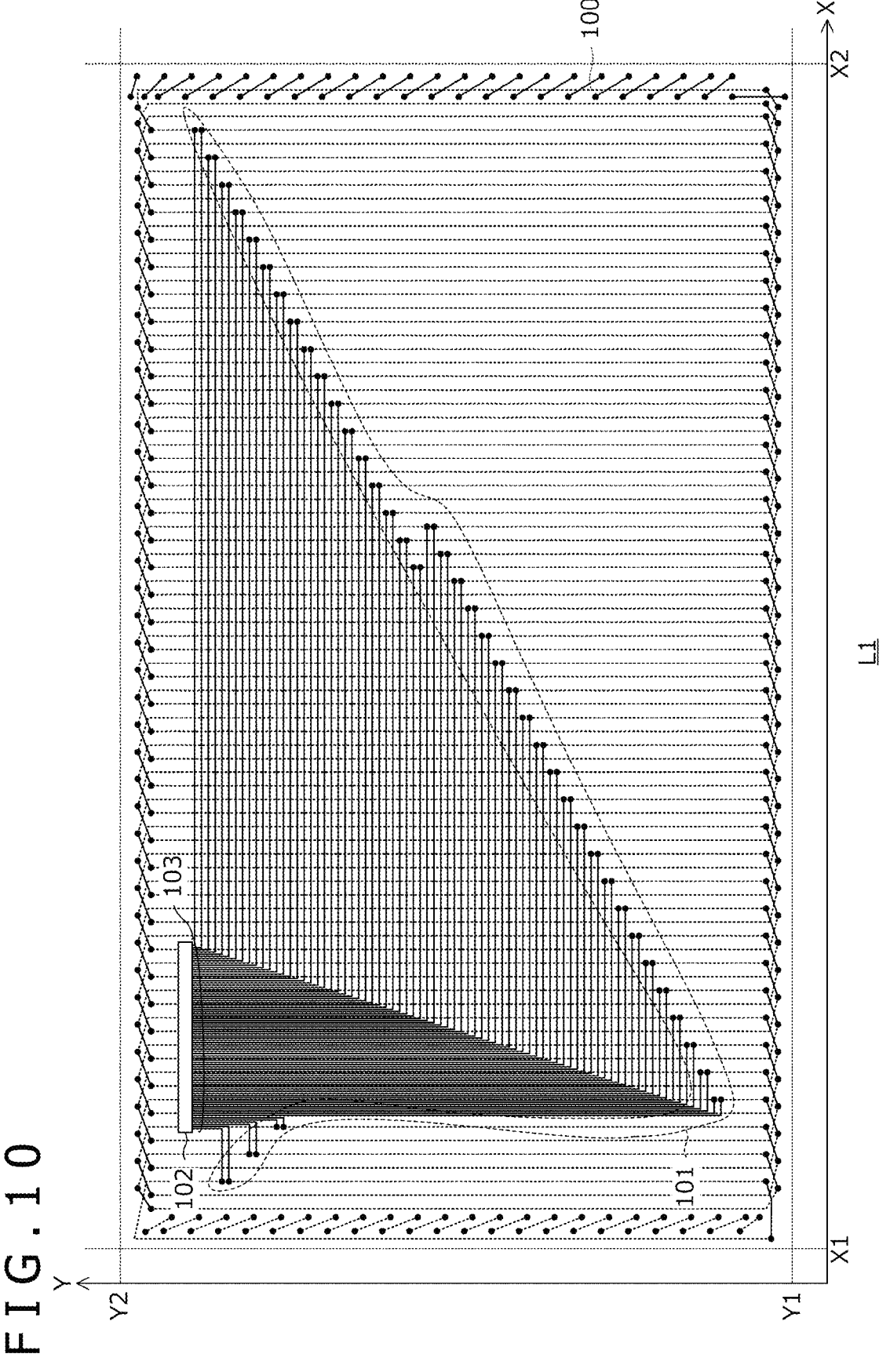

F I G . 1 1
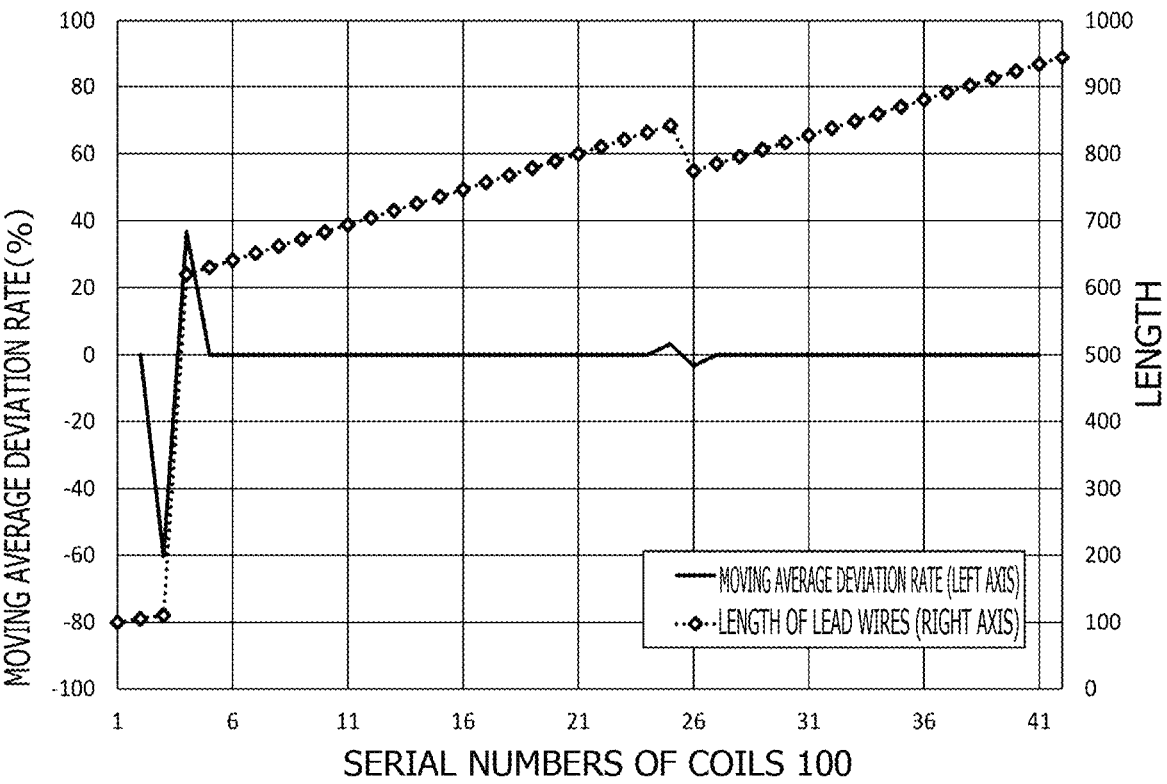

FIG.14

ELECTROMAGNETIC PEN POSITION SENSOR WITH LOW-COUPLING LEAD WIRING

TECHNICAL FIELD

The present disclosure relates to a sensor, and, in particular, to a sensor that is used with the sensor and a display device arranged in a stack.

BACKGROUND ART

A position detection device is known which detects, through a sensor, an alternating magnetic field sent from a position indicator to detect a position of the position indicator. Examples of known systems of this type of position detection device include an electro-magnetic (EM) system, which requires the position indicator to be provided with a battery, and an electro-magnetic resonance (EMR) (registered trademark) system, which causes power to be generated in the position indicator through an electromagnetic wave sent through the sensor from the position detection device. In the case of the EM system, electromagnetic waves are transmitted only from the position indicator to the position detection device, whereas, in the case of the EMR (registered trademark) system, electromagnetic waves are transmitted therebetween in both directions.

The sensor of the position detection device generally includes a collection of a plurality of first coils (i.e., loop electrodes) each of which is elongated and extends in a longitudinal direction of a detection region, and a plurality of second coils (i.e., loop electrodes) each of which is elongated and extends in a widthwise direction of the detection region.

Patent Document 1 discloses an example of a sensor of a position detection device including such first and second coils. In this example, connection points between the coils and corresponding lead wires are arranged not along an edge of a detection region but in a central portion of the detection region, and thus the lead wires extend within the detection region to help minimize an ineffective (non-sensible) area outside of the detection region. Meanwhile, Patent Document 2 discloses an example of a sensor of a position detection device in which each of the first and second coils is obliquely formed.

PRIOR ART DOCUMENT

Patent Document

Patent Document 1: Japanese Patent No. 4405247
Patent Document 2: PCT Patent Publication No. WO2019/171511

SUMMARY OF INVENTION

Technical Problems

In Patent Document 1, each of the lead wires is arranged to extend parallel to the corresponding coil. This arrangement causes significant magnetic coupling to occur between the lead wire and the coil, which may cause a signal passing through one of the lead wire and the coil to be superposed upon the other. If the first and second coils described in Patent Document 1 are obliquely formed as described in Patent Document 2, sections in which the lead wires and the corresponding coils run parallel to each other can be reduced to achieve a reduction in magnetic coupling therebetween, but this leads to a problem in that, because of the oblique formation of the first and second coils, coordinate transformation is required when the coordinates of a pen are calculated.

Accordingly, one aspect of the present disclosure is to provide a sensor that is able to achieve a reduction in magnetic coupling occurring between the lead wires and the corresponding coils without the need to obliquely form the first and second coils.

In addition, in the case where the lead wires are formed so as to extend at an angle to the first and second coils, two wiring layers are currently required for wiring of the lead wires as described in Patent Document 2. However, an increase in the number of layers causes an increased production cost of the sensor, and accordingly, there has been a demand for wiring the lead wires in only one layer.

Accordingly, another aspect of the present disclosure is to provide a sensor that allows the lead wires, disposed obliquely with respect to the first and second coils, to be arranged in only one layer.

In addition, the position detection device is sometimes configured to acquire an intensity distribution of an alternating magnetic field with use of two or more adjacent coils, and to derive the position of the position indicator on the basis of the intensity distribution. In this case, if there is a large difference in parasitic resistance among the two or more adjacent coils, the intensity distribution may be distorted, making it difficult to derive an accurate position.

Accordingly, yet another aspect of the present disclosure is to provide a sensor that enables the position detection device to accurately derive the position of the position indicator.

Technical Solution

A sensor according to a first aspect of the present disclosure is a sensor including a plurality of coils including a plurality of first coils each extending in a first direction parallel to a side of a rectangular detection region, and a plurality of second coils each extending in a second direction perpendicular to the first direction; a plurality of terminals provided for one ends and other ends of the plurality of coils; and a plurality of lead wires which connect the plurality of terminals to the corresponding one ends and other ends of the plurality of coils. The plurality of lead wires are arranged to extend along any of one or more directions which are at an angle relative to both the first direction and the second direction.

A sensor according to a second aspect of the present disclosure is the sensor according to the first aspect of the present disclosure, in which the plurality of lead wires are formed in a first wiring layer. The plurality of lead wires include a plurality of first lead wires connected to the one ends and other ends of the plurality of first coils, and a plurality of second lead wires connected to the one ends and other ends of the plurality of second coils. The plurality of terminals include a plurality of first terminals connected to the plurality of first coils, and a plurality of second terminals connected to the plurality of second coils. The plurality of first lead wires are electrically connected to the corresponding one ends or other ends of the plurality of first coils at first connection points provided in the first wiring layer. The plurality of second lead wires are electrically connected to the corresponding one ends or other ends of the plurality of second coils at second connection points provided in the first wiring layer. The plurality of terminals, the first connection points, and the second connection points are arranged such that a first region included in the first wiring layer and including the first connection points and the plurality of first terminals does not overlap with a second region included in the first wiring layer and including the second connection points and the plurality of second terminals.

A sensor according to a third aspect of the present disclosure is the sensor according to the first aspect of the present disclosure, in which the plurality of terminals, connection points between the plurality of lead wires and the plurality of coils, and the shape of the lead wires are determined such that an absolute value of a moving average deviation rate of the lead wires per each of the coils does not exceed a predetermined value.

Advantageous Effects

According to the first aspect of the present disclosure, the plurality of lead wires are arranged to extend along any of one or more directions which are at an angle relative to both the first direction and the second direction. This enables a reduction in magnetic coupling occurring between the lead wires and the coils, without the need to obliquely form the first and second coils.

According to the second aspect of the present disclosure, the first region, in which the plurality of first lead wires are arranged to extend, and the second region, in which the plurality of second lead wires are arranged to extend, do not overlap with each other. This makes it possible to arrange the lead wires, disposed obliquely with respect to the first and second coils, in only one layer.

According to the third aspect of the present disclosure, it becomes possible to prevent creation of a large difference in parasitic resistance among two or more adjacent coils. This enables a position detection device to accurately derive a position of a position indicator.

BRIEF DESCRIPTION OF DRAWINGS

FIG. 4 is a diagram illustrating the arrangement of wires included in wiring layer L1 of the sensor 13.

FIG. 10 is a diagram illustrating the arrangement of wires included in a wiring layer L1 according to a comparative example.

FIG. 11 is a graph in which, for each of coils 100 illustrated in FIG. 10, a length of corresponding lead wires 103 (i.e., the combined length of two lead wires 103 connected to two ends of the coil 100) is plotted against the moving average deviation rate of the lengths of the lead wires 103 corresponding to the coil 100.

FIG. 14 is a diagram illustrating the arrangement of wires included in a wiring layer L1 of a sensor 13 according to a second embodiment.

EMBODIMENTS OF THE INVENTION

Hereinafter, embodiments of the present disclosure will be described in detail with reference to the accompanying drawings.

Figure 1:
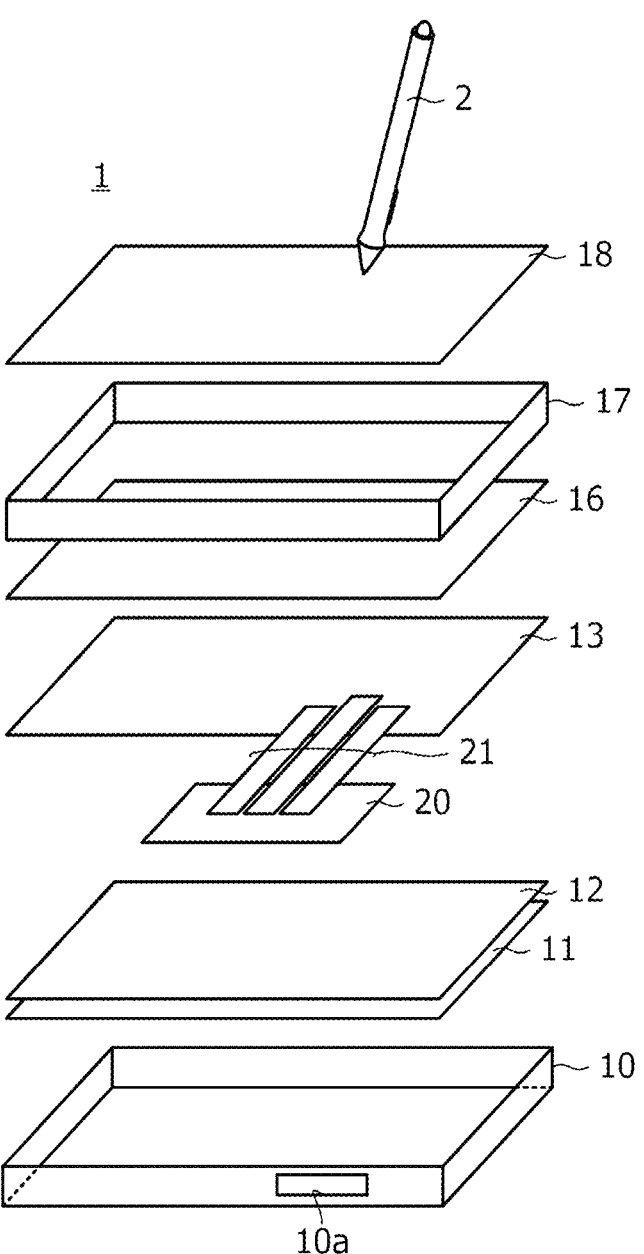
FIG. 1 is an exploded view of a tablet terminal 1 according to an embodiment of the present disclosure.

FIG. 1 is an exploded view of a tablet terminal 1 according to an embodiment of the present disclosure. FIG. 2A is a side view of the tablet terminal 1, and FIG. 2B is a rear view of the tablet terminal 1. In each of FIG. 1 and FIG. 2A, an upper side corresponds to a display surface (a touch surface) of the tablet terminal 1, while a lower side corresponds to a rear surface of the tablet terminal 1.

Figure 2:
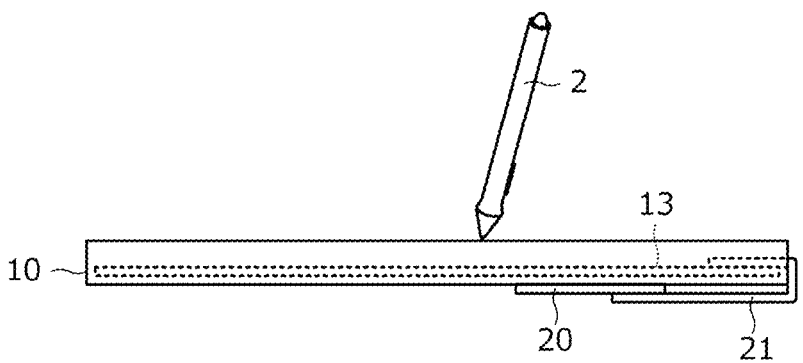
FIG. 2A is a side view of the tablet terminal 1.
FIG. 2B is a rear view of the tablet terminal 1.
Figure 2:
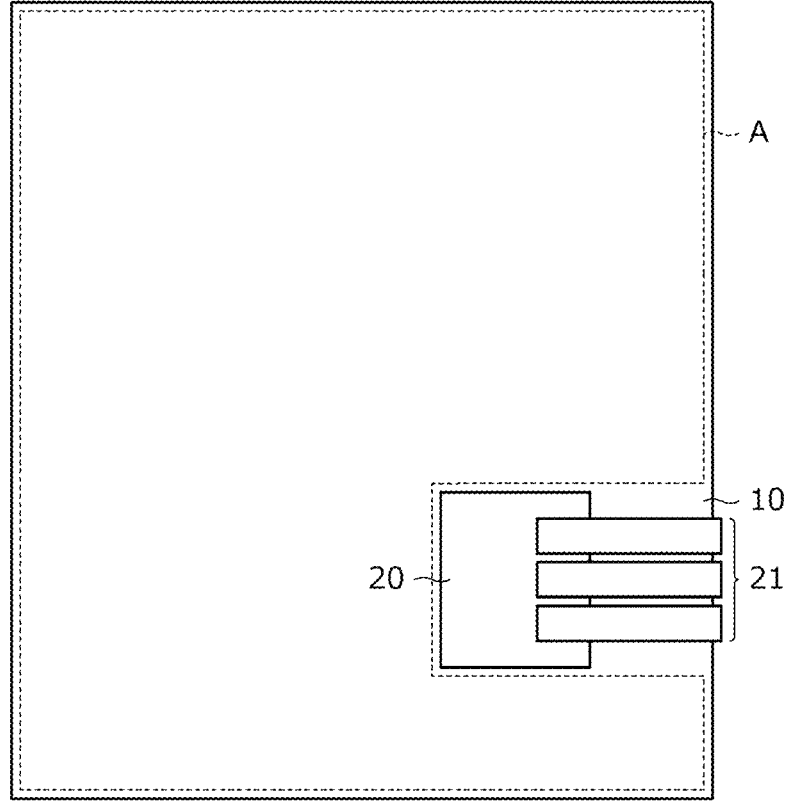

As illustrated in FIGS. 1 and 2, the tablet terminal 1 has a structure in which a shield plate 11, a spacer 12, a sensor 13, a display panel 16, and a glass 18 are stacked in this order from the rear side in a display module back cover 10, which has a bathtub shape having a closed rear surface side. Side surfaces of at least the sensor 13 and the display panel 16 among these elements are enclosed in a display module frame 17 used for protection and fixing. In one example, the display module frame 17 may be formed of adhesive tape. Although not illustrated in the figures, the tablet terminal 1 is configured to further include a housing that covers the entire tablet terminal 1 (including an integrated circuit 20 and bendable boards 21, which will be described below) except for a front surface of the glass 18. The front surface of the glass 18 forms the display surface and the touch surface of the tablet terminal 1.

As illustrated in FIG. 2, the integrated circuit 20 (a controller), which, together with the sensor 13, forms a position detection device, is installed on a rear side of the display module back cover 10. Although not illustrated in the figure, in addition to the integrated circuit 20, provided on the rear side of the display module cover 10 are a processor (processing circuit) that controls the entirety of the tablet terminal 1 and executes various applications, a control circuit for the display panel 16, and so on. Region A illustrated in FIG. 2B is a region in which such circuitry can be disposed.

The tablet terminal 1 is also configured to include bendable boards 21 used to connect the integrated circuit 20 to the sensor 13. While FIG. 1 and FIG. 2B illustrate an example in which three bendable boards 21 are used, the number of bendable boards 21 may be any value equal to or greater than one. Each of the bendable boards 21 is, for example, a flexible printed board (FPC) formed by a thin plastic film, and is configured to be bendable. Taking advantage of this property, the bendable boards 21 are disposed in the tablet terminal 1 and bent to enfold one sides of the sensor 13 and the display panel 16 as illustrated in FIG. 2A. At this time one ends of the bendable boards 21 are introduced into the display module back cover 10 through an opening portion 10*a* thereof, which is illustrated in FIG. 1, and are connected to corresponding terminal groups 40*a*, 40*b* and 40*c* of the sensor 13 (to be described below). Other ends of the bendable boards 21 are connected to the integrated circuit 20 on the rear side of the display module back cover 10.

The sensor 13 and the integrated circuit 20 form a position detection device that supports the EM system or the EMR (registered trademark) system as described above, and play a role of detecting the position of a stylus 2 (i.e., a position indicator) within a predetermined detection region. The detection region is a rectangular region that is set so as to have an area slightly greater than that of a display region of the display panel 16, and is arranged to cover the entire display region. The integrated circuit 20 detects, through the sensor 13, a pen signal (an alternating magnetic field) sent from the stylus 2, thereby detecting the position of the stylus 2 within the detection region. In addition, in the case where the EMR (registered trademark) system is supported, the integrated circuit 20 also performs a process of transmitting an electromagnetic wave through the sensor 13 to cause power to be generated in the stylus 2. In this case, the stylus 2 uses the power generated in this manner to transmit the pen signal.

The display panel 16 is a display device formed by, for example, a liquid crystal display, an organic electro-luminescence (EL) display, or an electronic paper device. The type of the display panel 16 is not limited to any particular type. The specific content to be displayed on the display panel 16 is controlled by the processor and the control circuit described above. Although not illustrated in the figures, the display panel 16 is configured to include a rectangular display region in which a plurality of pixels are arranged in a matrix, and a bezel region that is set so as to surround the display region. Wires for connecting the pixels to the control circuit are arranged in the bezel region.

The sensor 13 is disposed on the rear side of the display panel 16. This arrangement prevents a reduction in visibility of the display panel 16 due to presence of lead wires 42*x* and 42*y* of coils 41*x* and 41*y*, as described below, even when the lead wires 42*x* and 42*y* are arranged in a central portion of the detection region in the sensor 13. In addition, the above arrangement makes it possible to reduce the area of a region which surrounds the detection region and which is not usable for detecting the position of the stylus 2 (i.e., the above-mentioned ineffective area) to thereby reduce the area of the above-mentioned bezel region.

The shield plate 11 is a magnetic member disposed on the rear side of the sensor 13, and functions as an electromagnetic shield to prevent electromagnetic waves generated in the sensor 13 from leaking to the rear side. In addition, the shield plate 11 also plays a role as a magnetic path of magnetic flux generated in the sensor 13. The spacer 12 is, for example, a double-sided tape, and plays a role of providing isolation between the shield plate 11 and wires provided in the sensor 13 as well as fixing the sensor 13 to the shield plate 11.

Figure 3:
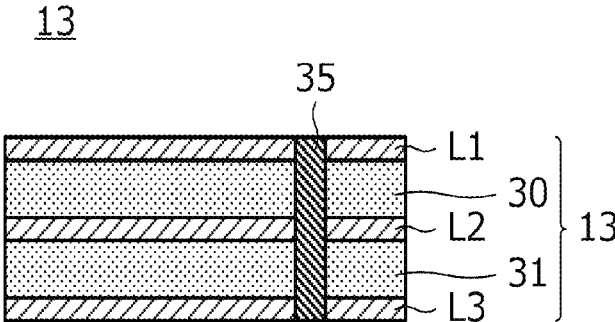
FIG. 3 is a schematic sectional view of a sensor 13 illustrated in FIG. 1.

FIG. 3 is a schematic sectional view of the sensor 13. As illustrated in this figure, the sensor 13 is formed by a multi-layer board including a wiring layer L1 (i.e., a first wiring layer), an insulating layer 30, a wiring layer L2 (i.e., a second wiring layer), an insulating layer 31, and a wiring layer L3 (i.e., a third wiring layer) stacked in this order from the side of the display surface. A plurality of via conductors 35 are provided in the sensor 13. Each via conductor 35 passes through the sensor 13 from the wiring layer L1 to the wiring layer L3, and plays a role of connecting wires in the wiring layers L1, L2 and L3 with one another.

Figure 5:
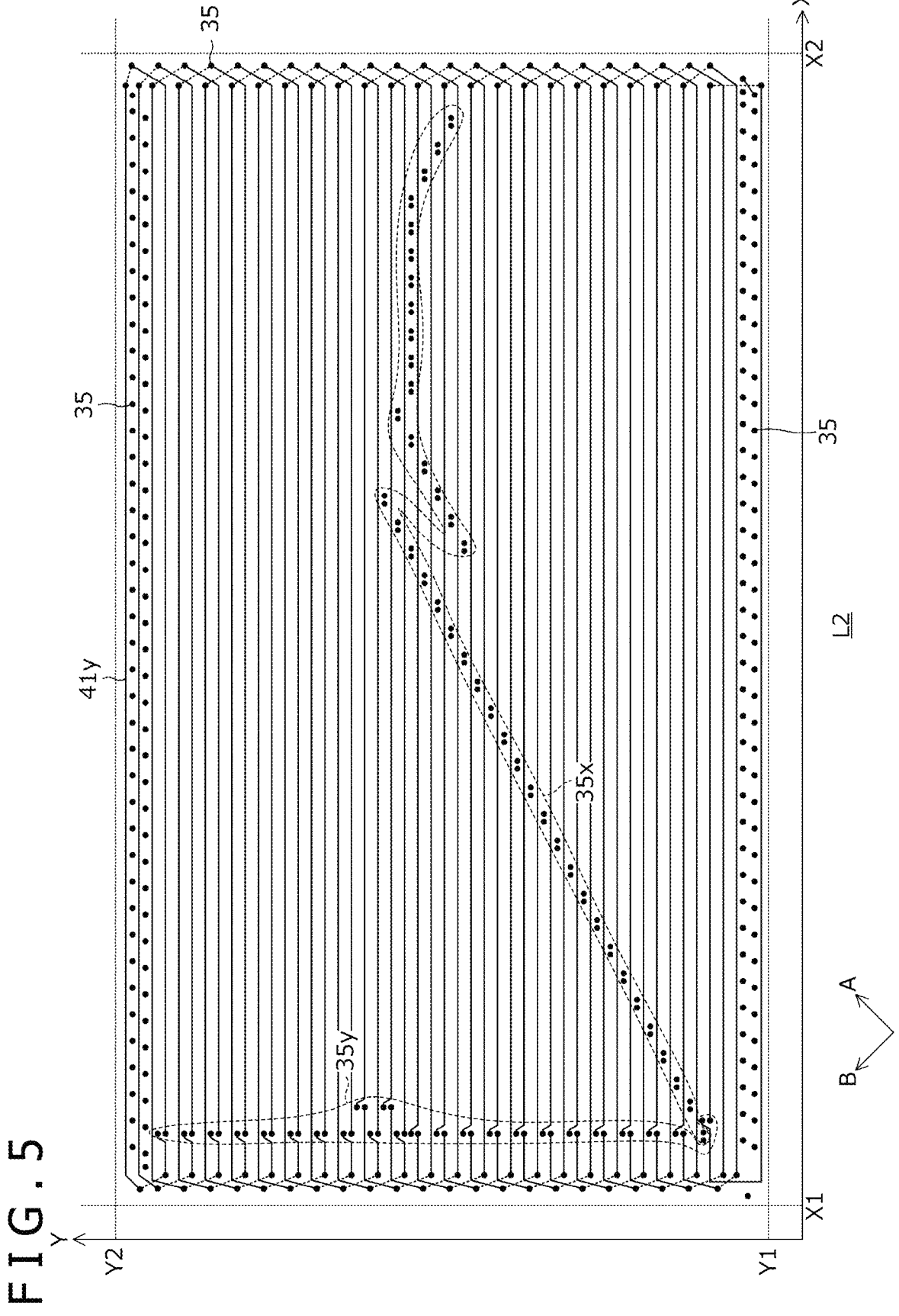
FIG. 5 is a diagram illustrating the arrangement of wires included in wiring layer L2 of the sensor 13.
Figure 6:
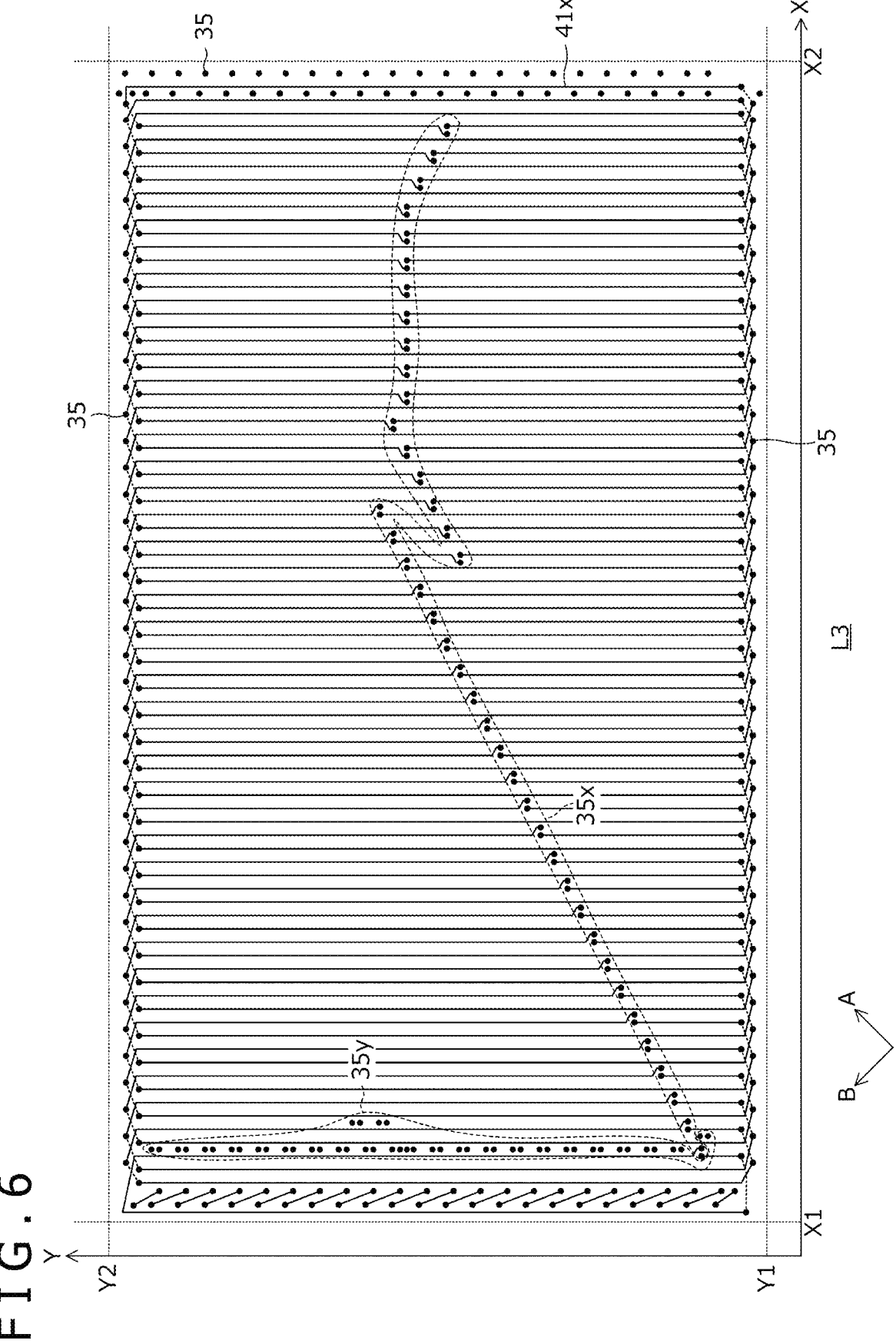
FIG. 6 is a diagram illustrating the arrangement of wires included in wiring layer L3 of the sensor 13.

FIGS. 4 to 6 are diagrams illustrating the arrangements of wires included in the wiring layers L1, L2 and L3, respectively. X-axis direction (i.e., a first direction) and Y-axis direction (i.e., a second direction) illustrated in these figures are a longitudinal direction and a widthwise direction, respectively, of the above-mentioned detection region. A rectangular region that has vertices at coordinates (X1, Y1), (X2, Y1), (X1, Y2), and (X2, Y2) illustrated in the figures corresponds to the detection region of the sensor 13. In addition, A-axis direction (i.e., a third direction) illustrated in the figures is a direction that does not coincide with either the X-axis direction or the Y-axis direction. In other words, the A-axis direction is a direction that is at a predetermined angle of more than zero degrees and less than 90 degrees with respect to the X direction. B-axis direction (i.e., a fourth direction) illustrated in the figures is also a direction that does not coincide with either the X-axis direction or the Y-axis direction. The B-axis direction is set so as not to be parallel to the A-axis direction. As illustrated in FIGS. 4 to 6, the A-axis direction is preferably set to be at an angle of 45 degrees relative to the X-axis direction, and the A-axis direction and the B-axis direction are preferably set to be perpendicular to each other.

First, referring to FIG. 6, a plurality of coils 41*x* extending in the Y direction (i.e., second coils) are formed in the wiring layer L3. While the example of the present embodiment as described includes forty-two (42) coils 41*x*, the number of the coils 41*x* is not limited to forty-two. The coils 41*x* are arranged at regular intervals in the X direction with some overlap therebetween. To enable the wiring with some overlap, portions of the coils 41*x* are formed additionally in the wiring layer L1 or in the wiring layer L2 through the via conductors 35 shown as black dots in the figure.

Next, referring to FIG. 5, a plurality of coils 41*y* extending in the X direction (i.e., first coils) are formed in the wiring layer L2. While the example of the present embodiment as described includes twenty-four (24) coils 41*y*, the number of the coils 41*x* is not limited to twenty-four. The coils 41*y* are arranged at regular intervals in the Y direction with some overlap therebetween. To enable the wiring with some overlap, portions of the coils 41*y* are formed additionally in the wiring layer L1 or in the wiring layer L3 through the via conductors 35 shown as black dots in the figure.

Here, while FIGS. 4 to 6 illustrate an example in which the number of turns included in each of the coils 41*x* and 41*y* is one (1), the actual number of turns of each of the coils 41*x* and 41*y* may be greater than one, as illustrated in FIGS. 13 to 17 to be described later. The number of turns of each of the coils 41*x* and 41*y* is preferably six, for example.

As illustrated in FIGS. 5 and 6, each of the plurality of coils 41x and 41y is cut at an intermediate point, and two ends of the coil created by the cut are connected to two different ones of the via conductors 35. Hereinafter, the via conductors 35 that are connected to the ends of the coils 41x (i.e., second via conductors) may sometimes be referred to as via conductors 35x, and the via conductors 35 that are connected to the ends of the coils 41y (i.e., first via conductors) may sometimes be referred to as via conductors 35y.

Next, referring to FIG. 4, the wiring layer L1 is configured to include the terminal groups 40a to 40c, which are respectively connected to the above-mentioned three bendable boards 21. The terminal group 40a is used to connect the coils 41y to wires in the corresponding bendable board 21, and includes a plurality of internal terminals corresponding to one ends and other ends of the coils 41y. The terminal groups 40b and 40c are used to connect the coils 41x to wires in the corresponding bendable boards 21, and include a plurality of internal terminals corresponding to one ends and other ends of the coils 41x.

The plurality of lead wires 42x and 42y are formed in the wiring layer L1. The plurality of lead wires 42x (i.e., second lead wires) are provided for the ends of the plurality of coils 41x in a one-to-one relation, and connect the via conductors 35x to the corresponding internal terminals in the terminal groups 40b and 40c. The ends of the via conductors 35x, which are exposed in the wiring layer L1, form connection points (i.e., a second connection points) between the lead wires 42x and the ends of the corresponding coils 41x. Similarly, the plurality of lead wires 42y (i.e., first lead wires) are provided for the ends of the plurality of coils 41y in a one-to-one relation, and connect the via conductors 35y to the corresponding internal terminals in the terminal group 40a. The ends of the via conductors 35y, which are exposed in the wiring layer L1, form connection points (i.e., first connection points) between the lead wires 42y and the ends of the corresponding coils 41y.

Here, a concrete method of detecting the position of the stylus 2 through the integrated circuit 20 is described. The integrated circuit 20 first detects, sequentially for each of the plurality of coils 41x, a potential difference between two lead wires 42x corresponding to the coil 41x. The potential difference detected in this manner indicates the reception intensity of the pen signal transmitted from the stylus 2. The integrated circuit 20 then selects one coil 41x at which the detected reception intensity is the greatest as well as a predetermined number of coils 41x located in its vicinity and, based on the reception intensity of the pen signal detected for the selected coils 41x, derives an intensity distribution of the pen signal in the X direction. The position of a peak of the distribution is derived and is obtained as the x-coordinate of the stylus 2. The integrated circuit 20 performs similar processes with respect to the Y direction, thereby deriving the y-coordinate of the stylus 2, and outputs a pair of the x-coordinate and the y-coordinate to the above-mentioned processor.

An overview of the tablet terminal 1 according to the present embodiment has been described above. Next, some features of the tablet terminal 1 which characterize the present disclosure will be described in detail below. Such features of the present disclosure are illustrated, in particular, in FIG. 4, and three such features of the present disclosure are illustrated in FIG. 4. These three features will be described one by one in reference to FIG. 4.

The first feature is that the plurality of lead wires 42x and 42y, other than exceptional portions thereof, are arranged to extend along either the A direction or the B direction. This causes most portions of the plurality of lead wires 42x and 42y not to run parallel to any of the coils 41x and 41y, enabling a reduction in magnetic coupling occurring between the plurality of lead wires 42x and 42y and the plurality of coils 41x and 41y without the need to obliquely form the coils 41x and 41y.

The exceptional portions include connection portions 50 connected to the terminal groups 40a to 40c, bends 51, and connection portions 52 connected to the via conductors 35x and 35y, as illustrated in FIG. 4. Although, in FIG. 4, the connection portions 50, the bends 51, and the connection portions 52 are each indicated by the corresponding reference numeral only at one position because of spatial limits, it will be understood that the same is true of the connection portions 50, the bends 51, and the connection portions 52 at other positions not indicated by the reference numerals.

Figure 7:
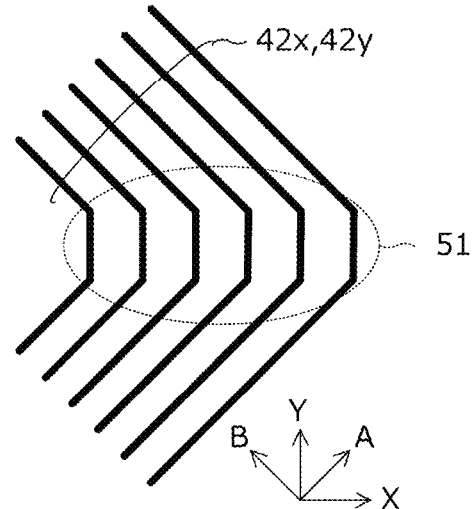
FIG. 7 is a diagram for explaining the details of bends 51 illustrated in FIG. 4.

FIG. 7 is a diagram for explaining the details of the bends 51. Although not illustrated in FIG. 4, each of the actual bends 51 has a portion (hereinafter referred to as an "intermediate portion") that extends in a direction intermediate between the A direction and the B direction (in FIG. 7, the Y direction) as illustrated in FIG. 7. This feature helps prevent an etching liquid, used to form the lead wires 42x and 42y by etching, from being deposited at the bends 51. This makes it possible to accurately form the shapes of the lead wires 42x and 42y at the bends 51.

Referring back to FIG. 4, the intermediate portion of each bend 51 is formed so as to have a necessary and sufficient length to prevent the etching liquid from being deposited. In addition, each of the connection portions 50 and 52 is formed so as to have a necessary and sufficient length for connecting the lead wire 42x or 42y to their connection targets (i.e., the terminal groups 40a to 40c or the via conductors 35x and 35y). Therefore, the length of each of the intermediate portions of the bends 51 and the connection portions 50 and 52 is sufficiently short compared to the total length of the lead wire 42x or 42y. In other words, the length of each of the intermediate portions of the bends 51 and the connection portions 50 and 52 can be set, and is actually set, to be small enough to have at least 80% or more, or preferably 90% or more, of each of the plurality of lead wires 42x and 42y extend along the A direction or the B direction. Therefore, it can be said that, even when the intermediate portions of the bends 51 and the connection portions 50 and 52 extend in the X direction or the Y direction, this does not cause a remarkable increase in the magnetic coupling occurring between the plurality of lead wires 42x and 42y and the plurality of coils 41x and 41y.

The second feature is that the terminal groups 40a to 40c and the plurality of via conductors 35x and 35y are arranged such that a region in which the plurality of lead wires 42x are arranged to extend in the wiring layer L1 (i.e., a second region) does not overlap with a region in which the plurality of lead wires 42y are arranged to extend in the wiring layer L1 (i.e., a first region). This makes it possible to arrange the plurality of lead wires 42x and 42y in only one layer as illustrated in FIG. 4, which makes it possible to reduce the production cost of the sensor 13.

Figure 8:
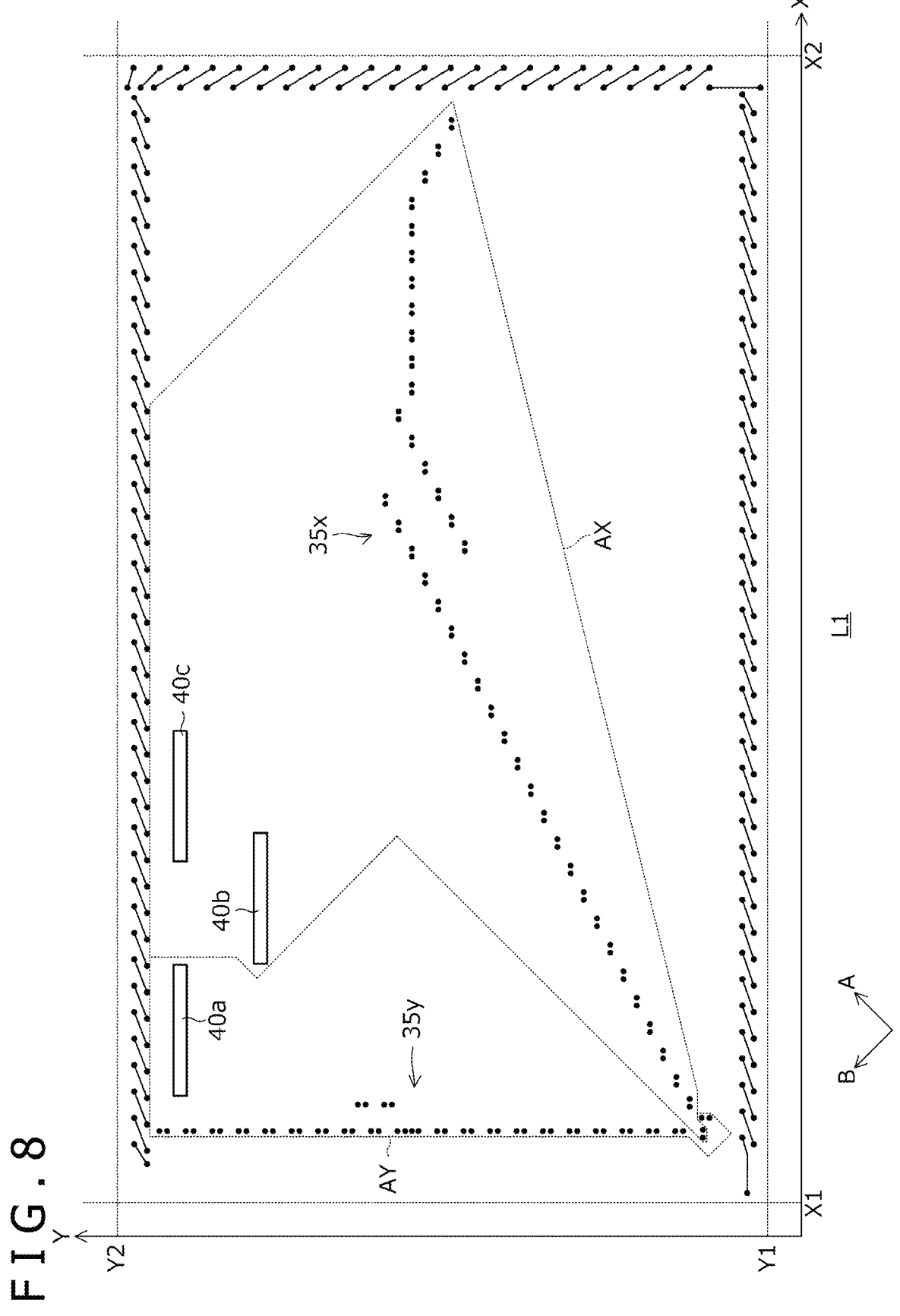
FIG. 8 is a diagram illustrating region AX, in which a plurality of lead wires 42$x$ are arranged to extend in the wiring layer L1, and illustrating region AY, in which a plurality of lead wires 42$y$ are arranged to extend in the wiring layer L1.

FIG. 8 is a diagram illustrating a region AX in which the plurality of lead wires 42x are arranged to extend in the wiring layer L1, and a region AY in which the plurality of lead wires 42y are arranged to extend in the wiring layer L1. As illustrated in this figure, the region AX is a region including the terminal groups 40b and 40c, which are connected to the plurality of coils 41x, and the plurality of via conductors 35x. Meanwhile, the region AY is a region including the terminal group 40*a* which is connected to the plurality of coils 41*y*, and the plurality of via conductors 35*y*. The arrangement of the terminal groups 40*a* to 40*c* and the plurality of via conductors 35*x* and 35*y* according to the present embodiment allows the region AX and the region AY to be arranged in the wiring layer L1 without overlapping with each other. This allows the plurality of lead wires 42*x* and 42*y* to be arranged in only one layer.

Referring back to FIG. 4, the third feature is that the arrangement of the terminal groups 40*a* to 40*c* and the plurality of via conductors 35*x* and 35*y* and the shape of each of the lead wires 42*x* and 42*y* are determined such that the absolute value of the moving average deviation rate of the lengths of the lead wires 42*x* or 42*y* for each of the coils 41*x* and 41*y* does not exceed a predetermined value.

Here, the moving average deviation rate is a value calculated in the following manner. Assuming that Lx denotes the combined length of the two lead wires 42*x* that are connected to a kth coil 41*x*, and that AVE(k) denotes the average of the lengths of the lead wires 42*x* of a group of coils 41*x* that are referenced to derive the intensity distribution of the pen signal when the greatest reception intensity of the pen signal is detected at the kth coil 41*x*, wherein the average value AVE(k) can be expressed by Eq. (1) below. Here, m denotes the number of coils 41*x* included in the group, and $\Sigma(L_k)$ denotes the sum of Lx of the coils 41*x* in the group.

$$AVE(k) = (1/m) \times \sum (L_k) \qquad (1)$$

The moving average deviation rate DEV (k) of the lead wires 42*x* of the coils 41*x* is expressed by Eq. (2) below, by using the average AVE(k) described above.

$$DEV(k) = ((L_k - AVE(k)) / AVE(k)) \times 100 \qquad (2)$$

While the foregoing description has been made with respect to the coils 41*x*, the moving average deviation rate of the lengths of the lead wires 42*y* for each of the coils 41*y* can be obtained in a similar manner. The terminal groups 40*a* to 40*c* and the plurality of via conductors 35*x* and 35*y* are arranged and the lead wires 42*x* and 42*y* are arranged to extend such that the absolute value of the moving average deviation rate obtained in the above-described manner does not exceed a predetermined value (at most 30%, preferably 20%), and this helps prevent a large difference in parasitic resistance created among the group of coils 41*x* (or coils 41*y*) that are used to derive the intensity distribution of the pen signal. This in turn helps accurately determine the position of the stylus 2 with the integrated circuit 20.

Figure 9A:
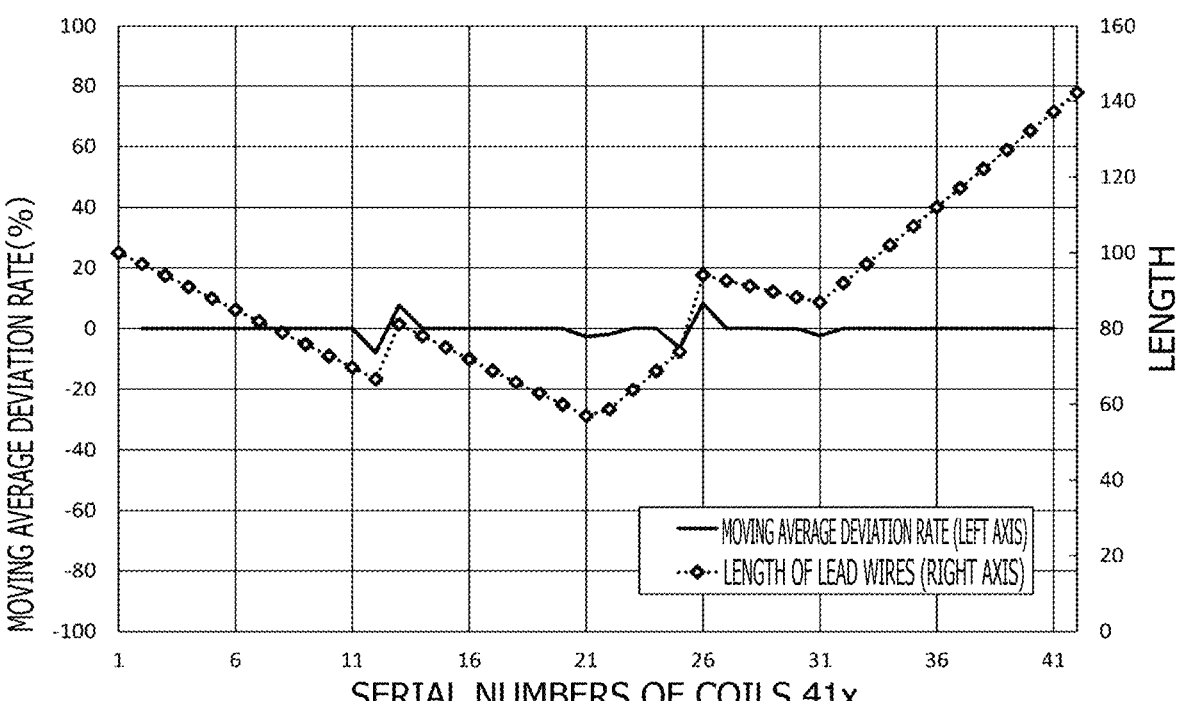
FIG. 9A is a graph in which, for each of coils 41$x$, a length of the corresponding lead wires 42$x$ (i.e., the combined length of two lead wires 42$x$ connected to two ends of the coil 41$x$) is plotted against the moving average deviation rate of the lengths of the lead wires 42$x$ corresponding to the coil 41$x$.
Figure 9B:
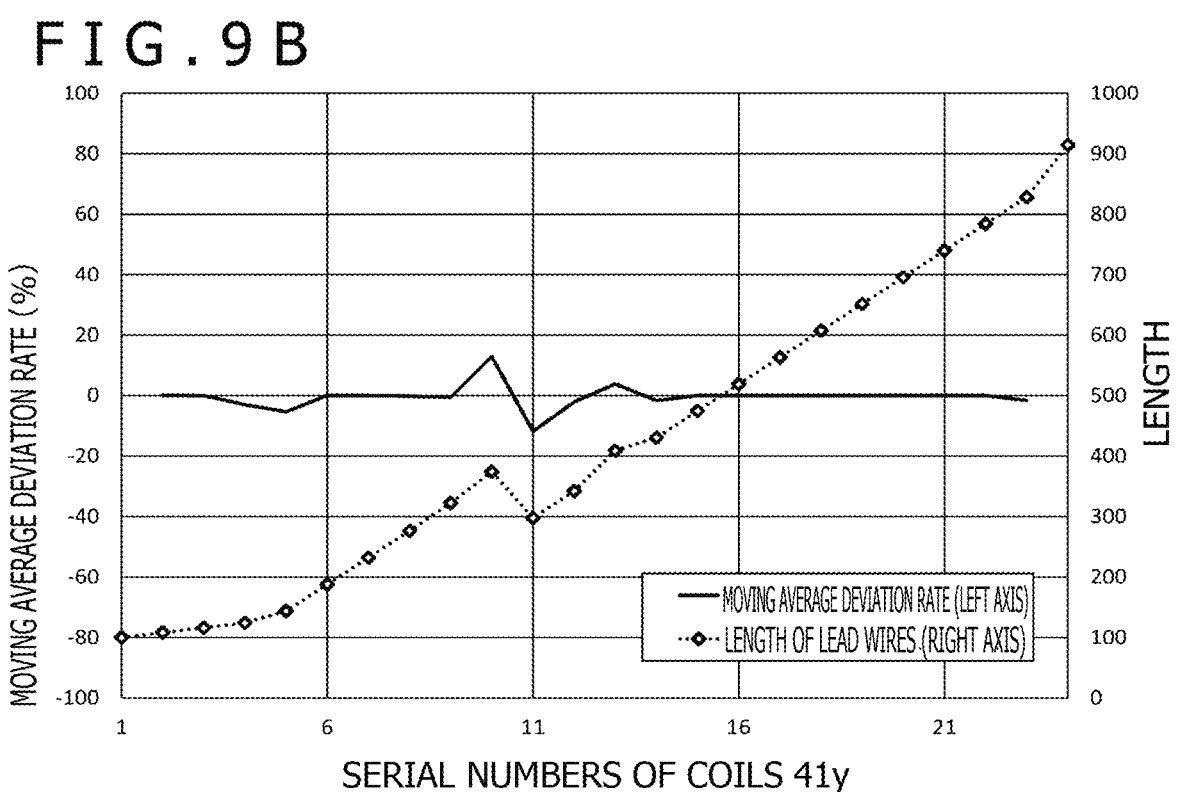
FIG. 9B is a graph in which, for each of coils 41$y$, a length of the corresponding lead wires 42$y$ (i.e., the combined length of two lead wires 42$y$ connected to two ends of the coil 41$y$) is plotted against the moving average deviation rate of the lengths of the lead wires 42$y$ corresponding to the coil 41$y$.

FIG. 9A is a graph in which, for each of the coils 41*x*, the length of the corresponding lead wires 42*x* (i.e., the combined length of the two lead wires 42*x* connected to two ends of the coil 41*x*) is plotted against the moving average deviation rate of the lengths of the lead wires 42*x* corresponding to the coil 41*x*. Meanwhile, FIG. 9B is a graph in which, for each of coils 41*y*, the lengths of the corresponding lead wires 42*y* (i.e., the combined length of the two lead wires 42*y* connected to two ends of the coil 41*y*) is plotted against the moving average deviation rate of the lengths of the lead wires 42*y* corresponding to the coil 41*y*. Note that these graphs illustrate a sample case in which the group of coils that are referenced to derive the intensity distribution of the pen signal are three coils including the coil at which the greatest reception intensity of the pen signal is detected and the two adjacent coils on both sides of that coil.

As illustrated in FIG. 9A and FIG. 9B, in the sensor 13, the absolute value of the moving average deviation rate of the lengths of the lead wires 42*x* or 42*y* corresponding to each of the coils 41*x* or the coils 41*y* is limited to 20% or less in both the X direction and the Y direction. Therefore, it can be said that the tablet terminal 1 according to the present embodiment is capable of accurately deriving the position of the stylus 2 through the integrated circuit 20.

FIG. 10 is a diagram illustrating the arrangement of wires included in a wiring layer L1 according to a comparative example. As illustrated in this figure, a sensor according to the present comparative example is configured to include a plurality of coils 100 each extending in the Y direction, and a plurality of via conductors 101 each connected to one end or another end of one of the coils 100. The coils 100 have the same shapes as those of the coils 41*x* illustrated in FIG. 6 except at the positions of both ends of each coil. In the wiring layer L1, there are formed a terminal group 102 including a plurality of internal terminals each corresponding to the one end or the other end of one of the coils 100, and a plurality of lead wires 103 that are provided for the ends of the coils 100 in a one-to-one relation. The plurality of lead wires 103 connect the via conductors 101 to the corresponding internal terminals in the terminal group 102. Note that, although the actual sensor includes a plurality of coils extending in the X direction, and corresponding via conductors, a corresponding terminal group, and corresponding lead wires, these components are not illustrated in FIG. 10.

Due to a spatial constraint imposed by the position of the opening portion 10*a* illustrated in FIG. 1, the terminal group 102 cannot be freely arranged and, therefore, the terminal group 102 is disposed in the vicinity of the upper-left corner of a detection region as illustrated in the figure. As a result, if the via conductors 101 are arranged without regard to the moving average deviation rate, the via conductors 101 for two adjacent coils 100, e.g., the third and fourth coils 100 from the left in FIG. 10, will be located at positions far away from each other.

FIG. 11 is a graph in which, for each of the coils 100, the length of the corresponding lead wires 103 (i.e., the combined length of the two lead wires 103) is plotted against the moving average deviation rate of the lengths of the lead wires 103 corresponding to the coil 100. FIG. 11 also illustrates an example case in which a group of coils 100 that are referenced to derive the intensity distribution of the pen signal are three coils 100 including the coil 100 at which the greatest reception intensity of the pen signal is detected and the two adjacent coils 100 on both sides of that coil 100.

As illustrated in FIG. 11, in the sensor according to the present comparative example, the absolute value of the moving average deviation rate for the third and fourth coils 100 exceeds 30%. In particular, the absolute value of the moving average deviation rate of the third coil 100 is so large as to exceed 60%. This creates a large difference in parasitic resistance among the group of coils 100 used to derive the intensity distribution of the pen signal, making it difficult to accurately derive the position of the stylus 2 through the integrated circuit 20 at least in the vicinity of the third coil 100 or the fourth coil 100. The sensor 13 according to the present embodiment prevents occurrence of such position where accurate derivation of the position of the stylus 2 becomes difficult, and makes it possible to accurately derive the position of the stylus 2 through the integrated circuit 20 at any position within the detection region.

Note that, in the case where the size of the detection region is fixed, instead of using the moving average deviation rate as described above, the difference in the lengths of the lead wires 42x or 42y between adjacent ones of the coils 41x or 41y may be used, which is a simpler method. That is, the arrangement of the terminal groups 40a to 40c and the plurality of via conductors 35x and 35y and the shape of each of the lead wires 42x and 42y may be determined such that the absolute value of the difference in the lengths of the lead wires 42x or 42y between adjacent ones of the coils 41x or 41y does not exceed a predetermined value. This also prevents a large difference in parasitic resistance created among the group of coils that are used to derive the intensity distribution of the pen signal, and makes it possible to accurately derive the position of the stylus 2 through the integrated circuit 20 at any position within the detection region.

As described above, in the sensor 13 according to the present embodiment, the plurality of lead wires 42x and 42y are arranged to extend along any of one or more directions (specifically, the A direction and the B direction) which are at an angle relative to both the X direction and the Y direction, and this enables a reduction in magnetic coupling occurring between the plurality of lead wires 42x and 42y and the plurality of coils 41x and 41y without the need to obliquely form the coils 41x and 41y.

In addition, in the sensor 13 according to the present embodiment, the region AX in which the plurality of lead wires 42x are arranged to extend and the region AY in which the plurality of lead wires 42y are arranged to extend do not overlap with each other, and this makes it possible to arrange the plurality of lead wires 42x and 42y, disposed obliquely with respect to the plurality of coils 41x and 41y, in only one layer, i.e., the wiring layer L1.

In addition, the sensor 13 according to the present embodiment is able to prevent a large difference in parasitic resistance created between two adjacent ones of the coils 41x and between two adjacent ones of the coils 41y, and this makes it possible to accurately derive the position of the stylus 2 through the integrated circuit 20 at any position within the detection region.

While preferred embodiments of the present disclosure have been described above, the present disclosure is not in any way limited to the embodiments described above, and it should be understood that various other embodiment of the present disclosure can be implemented within the principles of the present disclosure.

Figure 12:
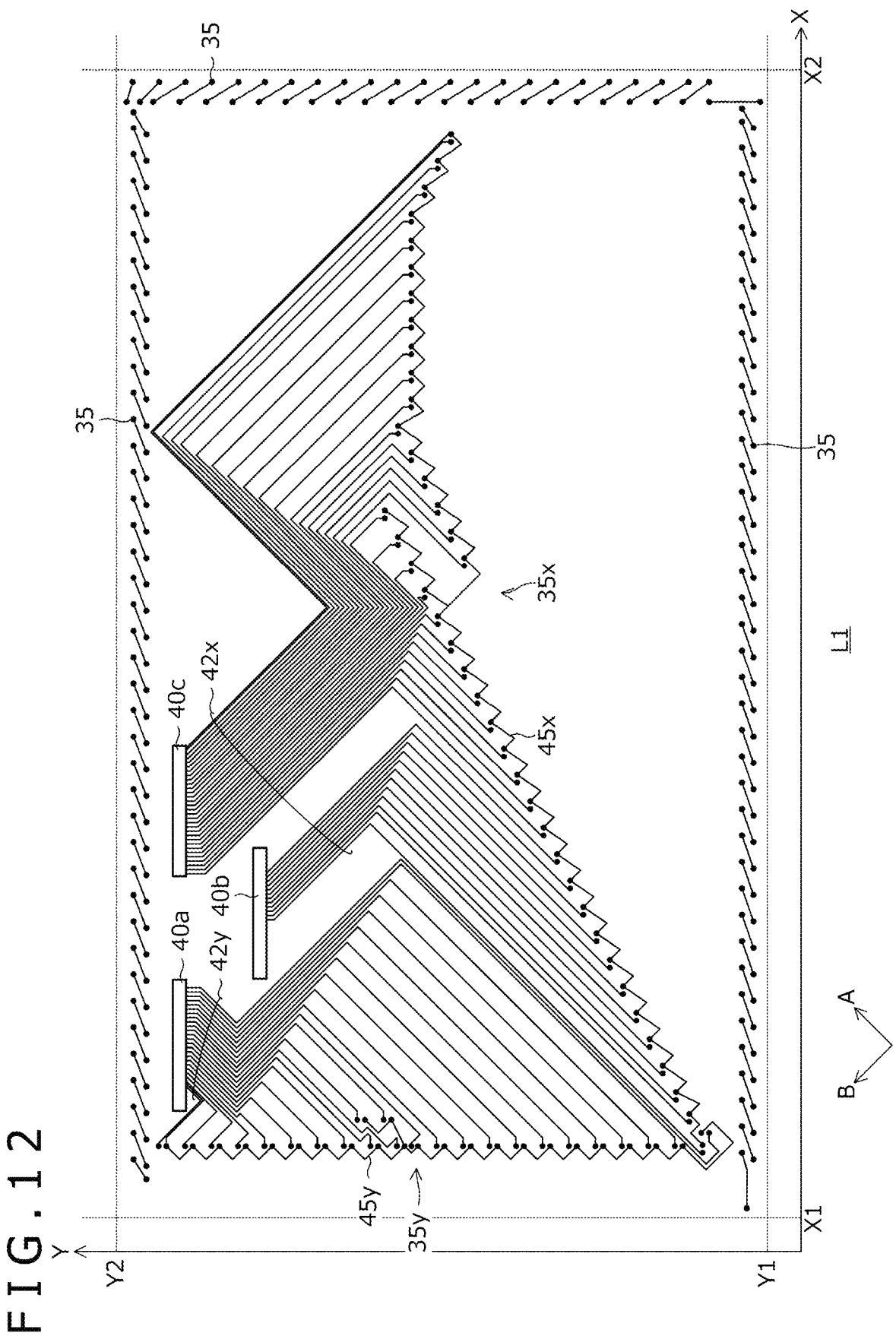
FIG. 12 is a diagram illustrating the arrangement of wires included in a wiring layer L1 of a sensor 13 according to an example modification of the present embodiment.

For example, FIG. 12 is a diagram illustrating the arrangement of wires included in a wiring layer L1 of a sensor 13 according to an example modification of the present embodiment. As illustrated in this figure, in the present example modification, a plurality of via conductors 35x each connected to one end of a separate one of a plurality of coils 41x are commonly connected through a common connection wire 45x, and the common connection wire 45x is connected to a terminal group 40c through only a single lead wire 42x. Similarly, a plurality of via conductors 35y each connected to one end of a separate one of a plurality of coils 41y are commonly connected through a common connection wire 45y, and the common connection wire 45y is connected to the terminal group 40a through only a single lead wire 42y. By applying a ground potential to the one ends of the plurality of coils 41x and the one ends of the plurality of coils 41y, the above arrangement allows an integrated circuit 20 to properly receive a pen signal. Note that the ground potential may alternatively be applied to the other ends of the plurality of coils 41x and the other ends of the plurality of coils 41y, and in this case, the other ends of the coils 41x or the coils 41y may be connected through a common connection wire.

In the present example modification, the common connection wires 45x and 45y, other than some exceptional portions thereof, are preferably arranged to extend along the A direction or the B direction. The exceptional portions include bends and connection portions connected to the via conductors 35x and 35y, similarly to the case of the lead wires 42x and 42y. The above arrangement enables a reduction in magnetic coupling occurring between the common connection wires 45x and 45y and the plurality of coils 41x and 41y.

EMBODIMENTS

Hereinafter, first to fifth embodiments of the sensor 13 will be described.

Figure 13:
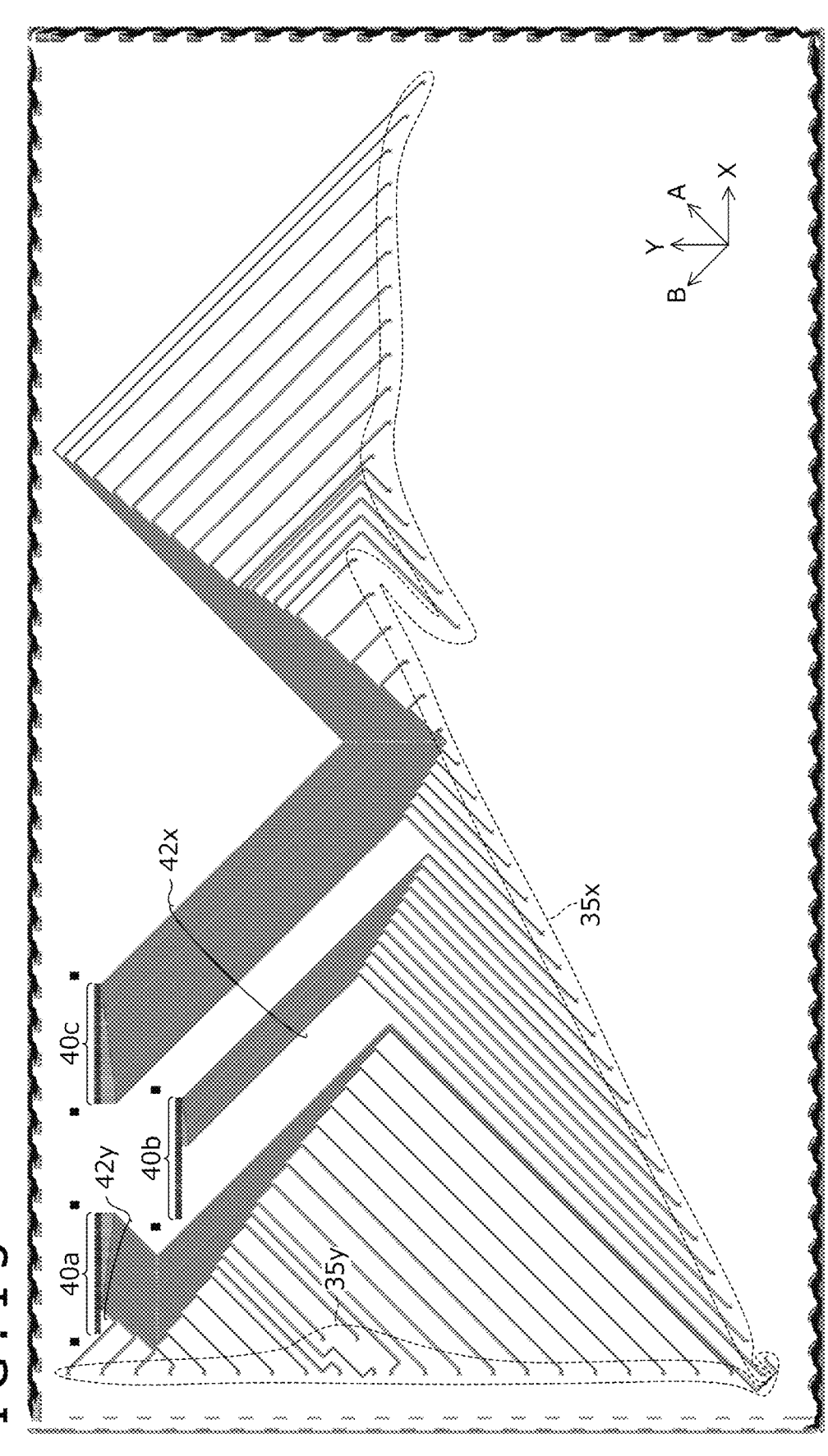
FIG. 13 is a diagram illustrating the arrangement of wires included in a wiring layer L1 of a sensor 13 according to a first embodiment.

FIG. 13 is a diagram illustrating the arrangement of wires included in a wiring layer L1 of a sensor 13 according to the first embodiment. As will be understood by comparing this figure with FIG. 4, the arrangement of terminal groups 40a to 40c and via conductors 35x and 35y and the shape of each of lead wires 42x and 42y according to the present embodiment are substantially similar to the arrangement illustrated in FIG. 4. Meanwhile, although not illustrated in FIG. 13, the number of turns of each of coils 41x and 41y according to the present embodiment is six, and accordingly, the number of via conductors disposed along an edge of a detection region is greater than in FIG. 4. The same is true of the number of turns in each of FIGS. 14 to 17, which will be presented later.

Figure 14:
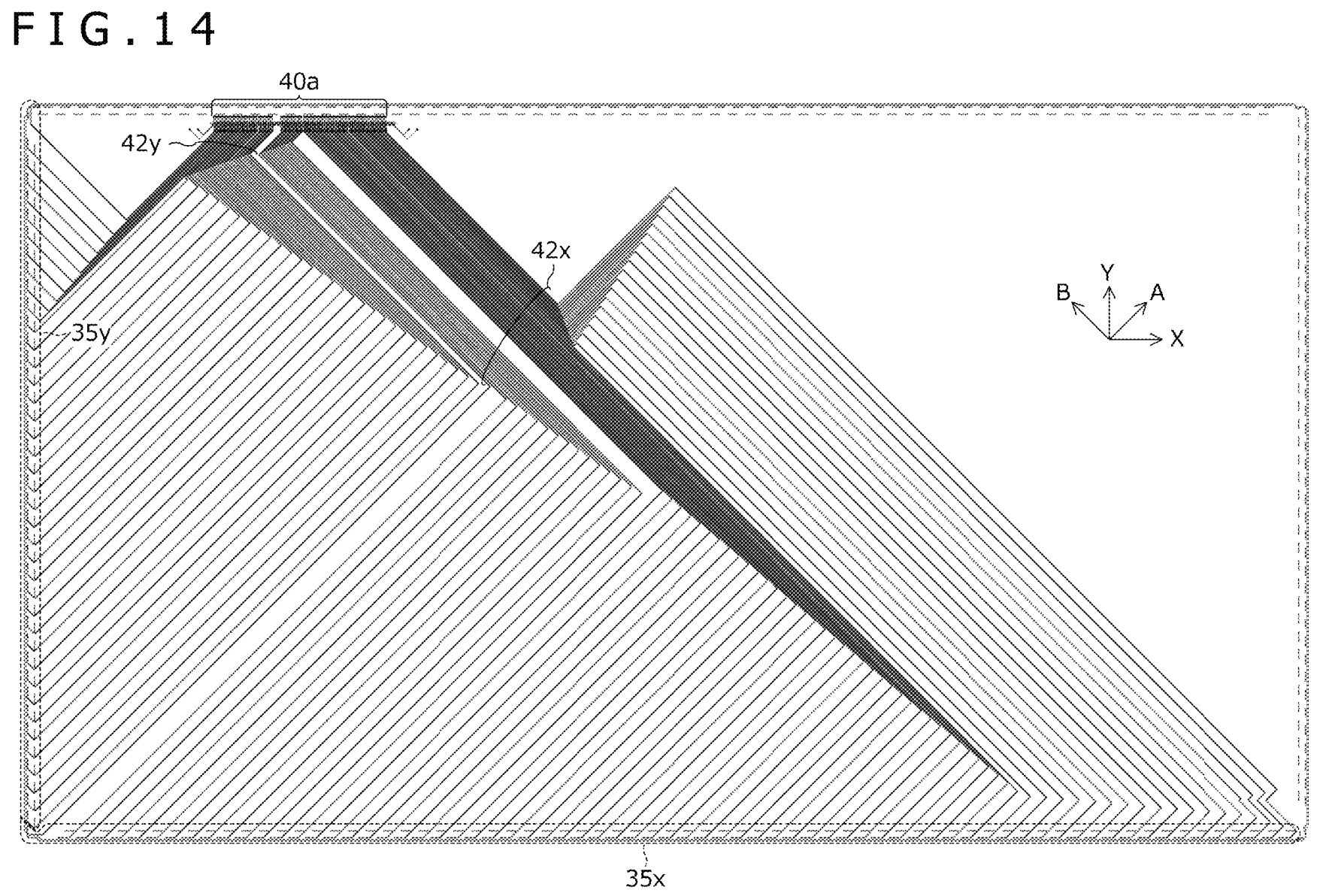

FIG. 14 is a diagram illustrating the arrangement of wires included in a wiring layer L1 of a sensor 13 according to the second embodiment. In the present embodiment, via conductors 35x are arranged along one side of a detection region which forms an end in the Y direction, and via conductors 35y are arranged along one side of the detection region which forms an end in the X direction. In addition, all of a plurality of internal terminals connected to both ends of a plurality of lead wires 42x and 42y are arranged in a straight line to form a single terminal group 40a.

Figure 15:
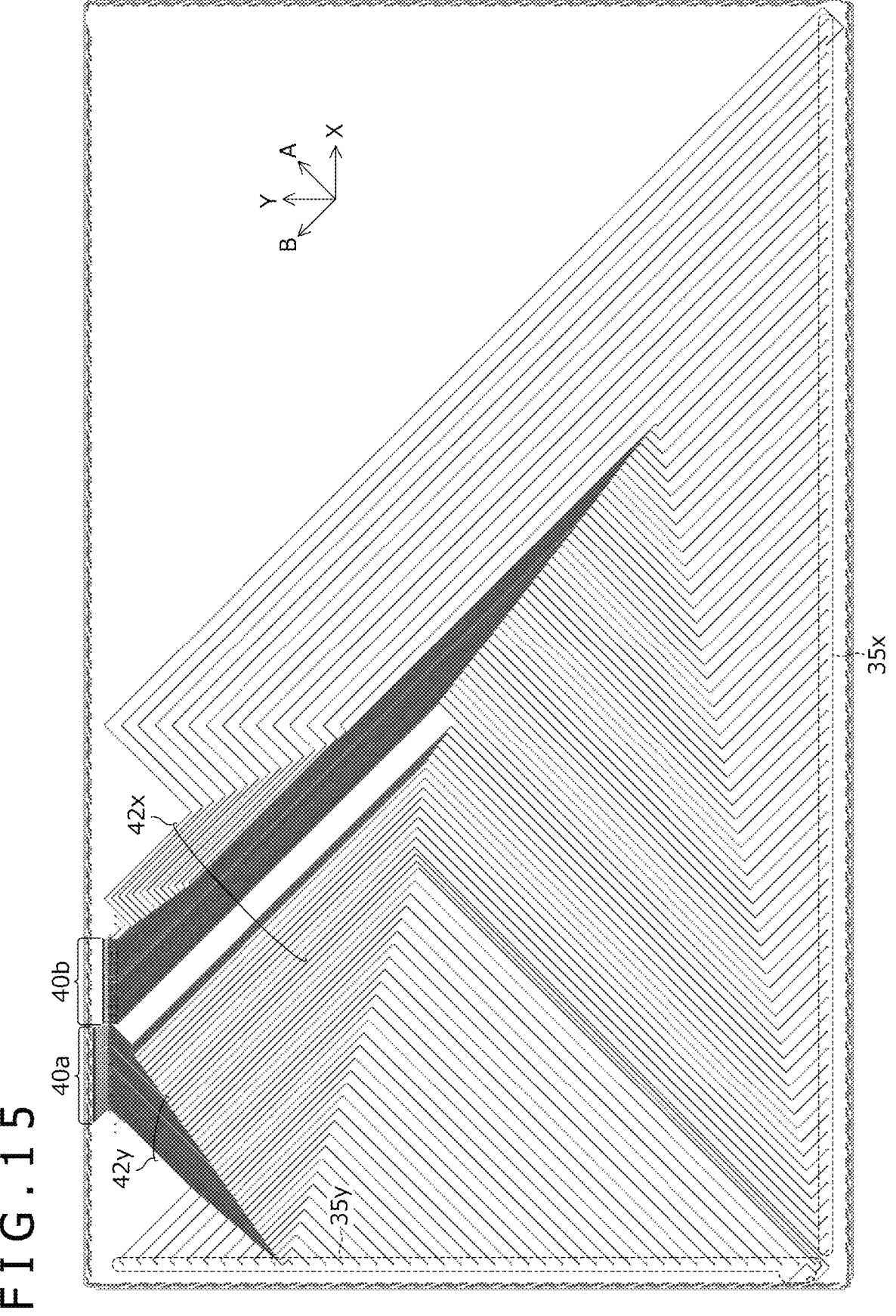
FIG. 15 is a diagram illustrating the arrangement of wires included in a wiring layer L1 of a sensor 13 according to a third embodiment.

FIG. 15 is a diagram illustrating the arrangement of wires included in a wiring layer L1 of a sensor 13 according to the third embodiment. Also in the present embodiment, via conductors 35x are arranged along one side of a detection region which forms an end in the Y direction, and via conductors 35y are arranged along one side of the detection region which forms an end in the X direction. However, the plurality of via conductors 35x and 35y are positioned slightly inward in the detection region compared to the second embodiment. In addition, a single terminal group 40b is formed by a plurality of internal terminals connected to both ends of all of a plurality of lead wires 42x and some of a plurality of lead wires 42y, while a single terminal group 40a is formed by a plurality of internal terminals connected to both ends of the rest of the plurality of lead wires 42y.

Figure 16:
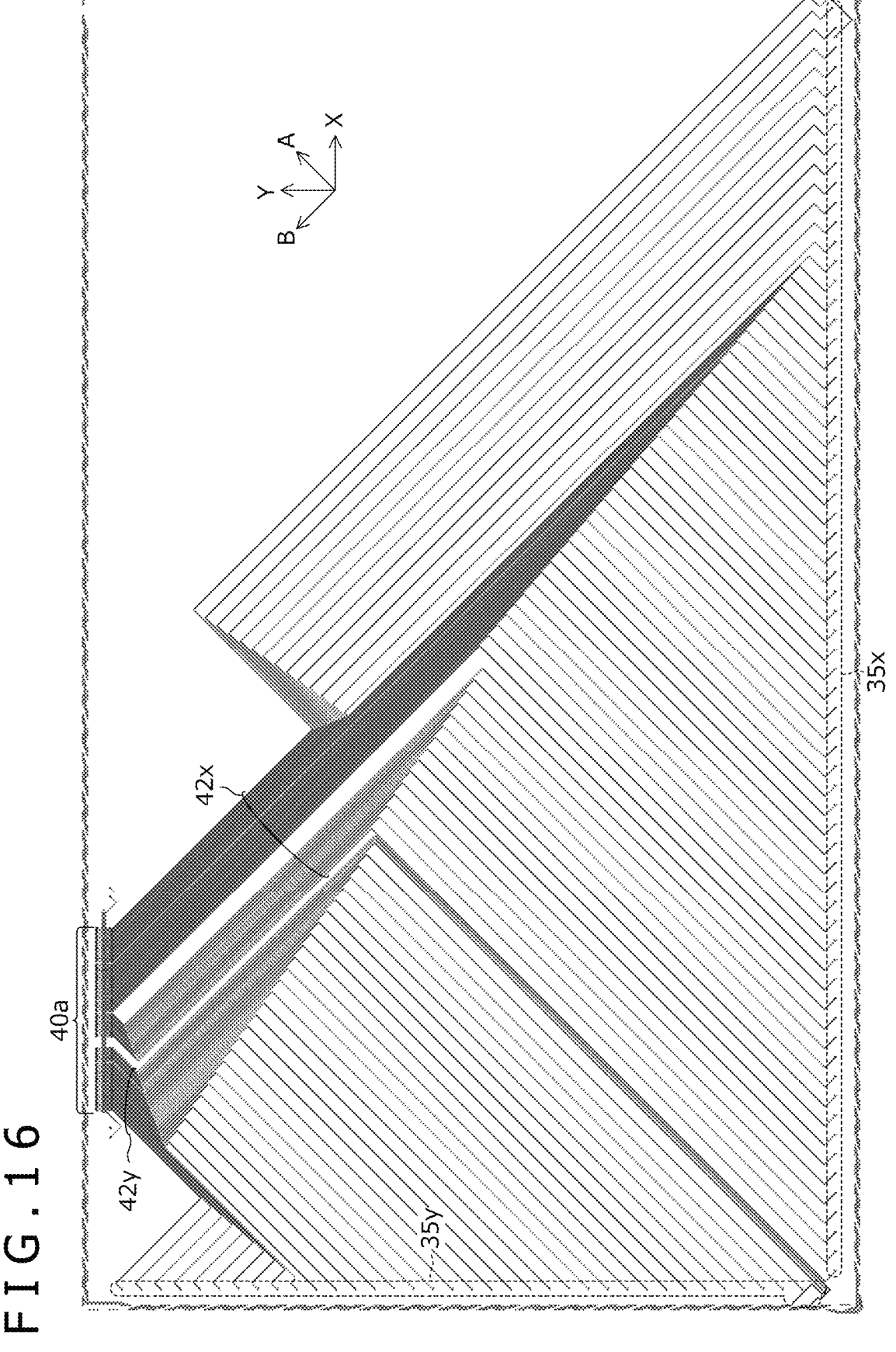
FIG. 16 is a diagram illustrating the arrangement of wires included in a wiring layer L1 of a sensor 13 according to a fourth embodiment.

FIG. 16 is a diagram illustrating the arrangement of wires included in a wiring layer L1 of a sensor 13 according to the fourth embodiment. As will be understood by comparing this figure with FIG. 15, the present embodiment is similar to the third embodiment except in that all of a plurality of internal terminals connected to both ends of a plurality of lead wires 42x and 42y are arranged in a straight line to form a single terminal group 40*a*, and that the shape of each of the plurality of lead wires 42*x* and 42*y* is slightly different from that in the third embodiment.

In each of the first to fourth embodiments, the plurality of lead wires 42*x* and 42*y*, excluding connection portions connected to the corresponding terminal groups, bends, and connection portions connected to the via conductors 35*x* and 35*y*, are arranged to extend along the A direction or the B direction. In addition, the terminal group(s) and the plurality of via conductors 35*x* and 35*y* are arranged such that a region in which the plurality of lead wires 42*x* are arranged to extend in the wiring layer L1 does not overlap with a region in which the plurality of lead wires 42*y* are arranged to extend in the wiring layer L1. Further, the arrangement of the terminal group(s) and the plurality of via conductors 35*x* and 35*y* and the shape of each of the lead wires 42*x* and 42*y* are determined such that the absolute value of the moving average deviation rate of the lengths of the lead wires 42*x* or 42*y* corresponding to each of the coils 41*x* and 41*y* does not exceed a predetermined value. Accordingly, the sensor 13 according to each of the first to fourth embodiments exhibits advantageous effects similar to those exhibited by the sensor 13 according to the embodiment.

Figure 17:
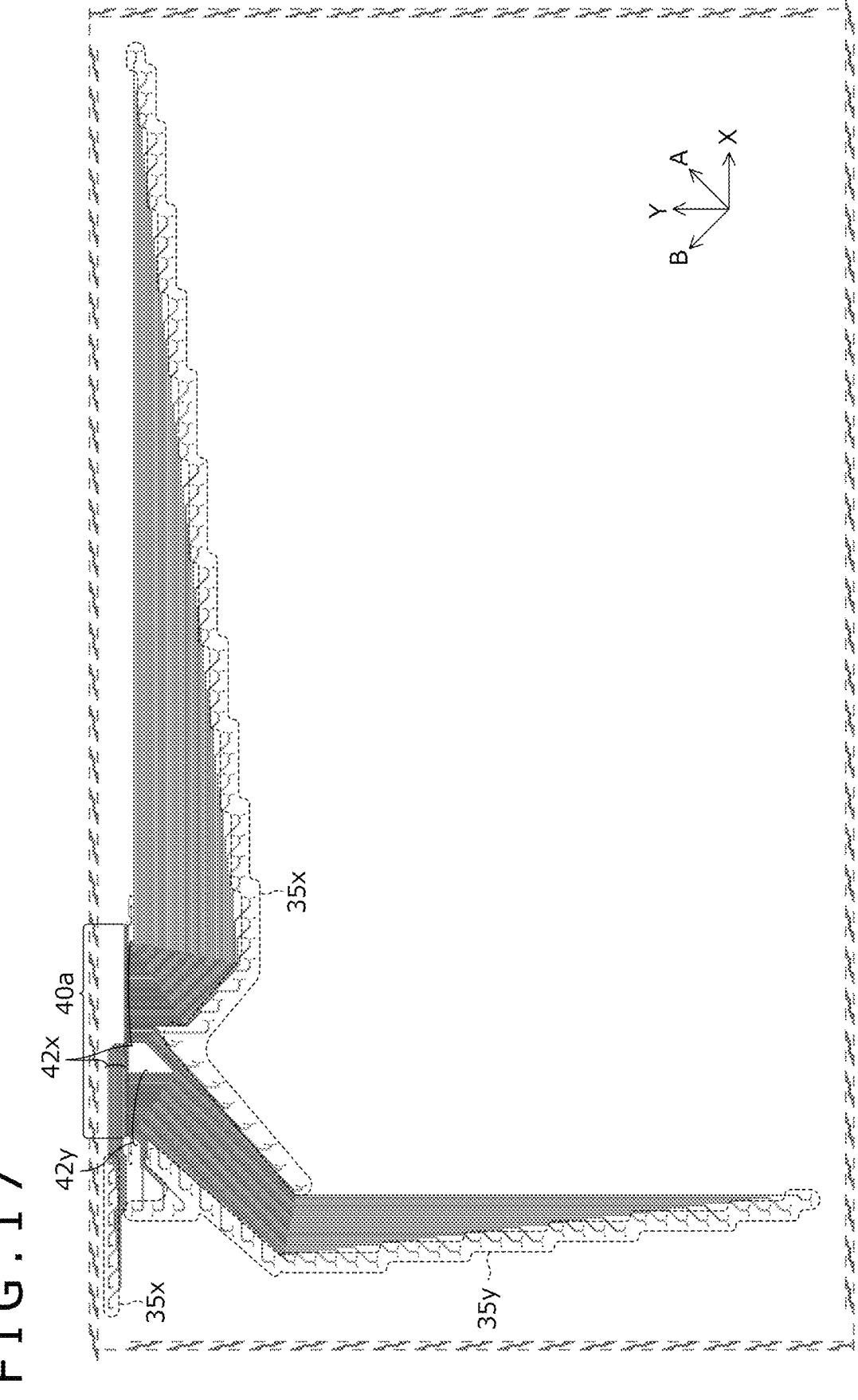
FIG. 17 is a diagram illustrating the arrangement of wires included in a wiring layer L1 of a sensor 13 according to a fifth embodiment.

FIG. 17 is a diagram illustrating the arrangement of wires included in a wiring layer L1 of a sensor 13 according to the fifth embodiment. The present embodiment is similar to the second embodiment, for example, in that all of a plurality of internal terminals connected to both ends of a plurality of lead wires 42*x* and 42*y* are arranged in a straight line to form a single terminal group 40*a*. Meanwhile, the present embodiment is largely different from the other embodiments in the arrangement of via conductors 35*x* and 35*y*. In particular, some of the plurality of via conductors 35*x* are positioned on an opposite side, via the terminal group 40*a*, with respect to the rest of the via conductors 35*x*.

Also in the present embodiment, the plurality of lead wires 42*x* and 42*y* include portions which extend along the A direction or the B direction. Accordingly, it can be said that a reduction in magnetic coupling occurring between the plurality of lead wires 42*x* and 42*y* and the plurality of coils 41*x* and 41*y* can be achieved compared to the example as illustrated in FIG. 10. In addition, the terminal group 40*a* and the plurality of via conductors 35*x* and 35*y* are arranged such that a region in which the plurality of lead wires 42*x* are arranged to extend in the wiring layer L1 does not overlap with a region in which the plurality of lead wires 42*y* are arranged to extend in the wiring layer L1. This makes it possible to arrange the plurality of lead wires 42*x* and 42*y*, disposed obliquely with respect to the plurality of coils 41*x* and 41*y*, in only one layer, i.e., the wiring layer L1.

DESCRIPTION OF REFERENCE SYMBOLS

1: Tablet terminal
2: Stylus
10: Display module back cover
10*a*: Opening portion
11: Shield plate
12: Spacer
13: Sensor
16: Display panel
17: Display module frame
18: Glass
20: Integrated circuit
21: Bendable board
30, 31: Insulating layer
35, 35*x*, 35*y*: Via conductor

40*a* to 40*c*: Terminal group
41*x*, 41*y*: Coil
42*x*, 42*y*: Lead wire
45*x*, 45*y*: Common connection wire
50, 52: Connection portion
51: Bend
L1 to L3: Wiring layer

The invention claimed is:

1. A sensor comprising:
a plurality of coils including a plurality of first coils each extending in a first direction parallel to a side of a rectangular detection region, and including a plurality of second coils each extending in a second direction perpendicular to the first direction;
a plurality of terminals provided to correspond to one ends and other ends of the plurality of coils; and
a plurality of lead wires which connect the plurality of terminals to the one ends or other ends of the plurality of coils, wherein
the plurality of lead wires are arranged, in a first wiring layer different from the plurality of first coils and the plurality of second coils, to extend within the detection region, and to extend linearly along any of one or more directions which intersect with each of the first direction and the second direction, so as to intersect with a long side of one of the plurality of coils within the detection region.

2. The sensor according to claim 1, wherein the plurality of lead wires, excluding connection portions thereof connected to the plurality of terminals, bends thereof, and connection portions thereof connected to the one ends or other ends of the plurality of coils, are arranged to extend along any of said one or more directions.

3. The sensor according to claim 1, wherein at least 80% or more of each of the plurality of lead wires is arranged to extend along any of said one or more directions.

4. The sensor according to claim 1, wherein said one or more directions include a third direction at an angle of 45 degrees relative to the first direction, and a fourth direction perpendicular to the third direction.

5. The sensor according to claim 1, wherein
the plurality of lead wires are arranged in the first wiring layer;
the plurality of lead wires include a plurality of first lead wires coupled to the one ends or other ends of the plurality of first coils, and include a plurality of second lead wires coupled to the one ends or other ends of the plurality of second coils;
the plurality of first lead wires are electrically connected to the one ends or other ends of the plurality of first coils, at a plurality of first connection points provided in the first wiring layer;
the plurality of second lead wires are electrically connected to the one ends or other ends of the plurality of second coils, at a plurality of second connection points provided in the first wiring layer; and
the plurality of terminals, the plurality of first connection points, and the plurality of second connection points are arranged so that a first region, in which the plurality of first lead wires extend, does not intersect with a second region, in which the plurality of second lead wires extend.

6. The sensor according to claim 5, further comprising:
a second wiring layer in which the plurality of first coils are arranged to extend;
a third wiring layer in which the plurality of second coils are arranged to extend;

a plurality of first via conductors connected to the one ends or other ends of the plurality of first coils; and a plurality of second via conductors connected to the one ends or other ends of the plurality of second coils, wherein the plurality of first connection points are connection points between the plurality of first via conductors and the first wiring layer, and the plurality of second connection points are connection points between the plurality of second via conductors and the first wiring layer.

7. The sensor according to claim 1, wherein arrangements of the plurality of terminals and connection points between the plurality of lead wires and the plurality of coils, and a shape of each of the plurality of lead wires, are determined such that an absolute value of a moving average deviation rate of the lead wires per coil does not exceed a predetermined value.

8. The sensor according to claim 7, wherein the predetermined value is 20%.

9. The sensor according to claim 2, wherein the plurality of lead wires, excluding the connection portions thereof connected to the plurality of terminals, the bends thereof, and the connection portions thereof connected to the one ends or other ends of the plurality of coils, are arranged to extend linearly along any of said one or more directions.

10. The sensor according to claim 5, wherein the first region includes those terminals connected to the plurality of first coils, out of the plurality of terminals, and includes the plurality of first connection points, and the second region includes those terminals connected to the plurality of second coils, out of the plurality of terminals, and includes the plurality of second connection points.

11. The sensor according to claim 7, wherein the moving average deviation rate DEV(k) of kth coil out of m number of the plurality of coils is calculated as:

$$DEV(k) = ((L_k - AVE(k))/AVE(k)) \times 100,$$

wherein $AVE(k)=(1/m) \times \Sigma(L_k)$ is an average length of the plurality of lead wires, and Lk is a combined length of two lead wires connected to the kth coil.

\* \* \* \* \*